United States Patent Office 3,564,380
Patented Feb. 16, 1971

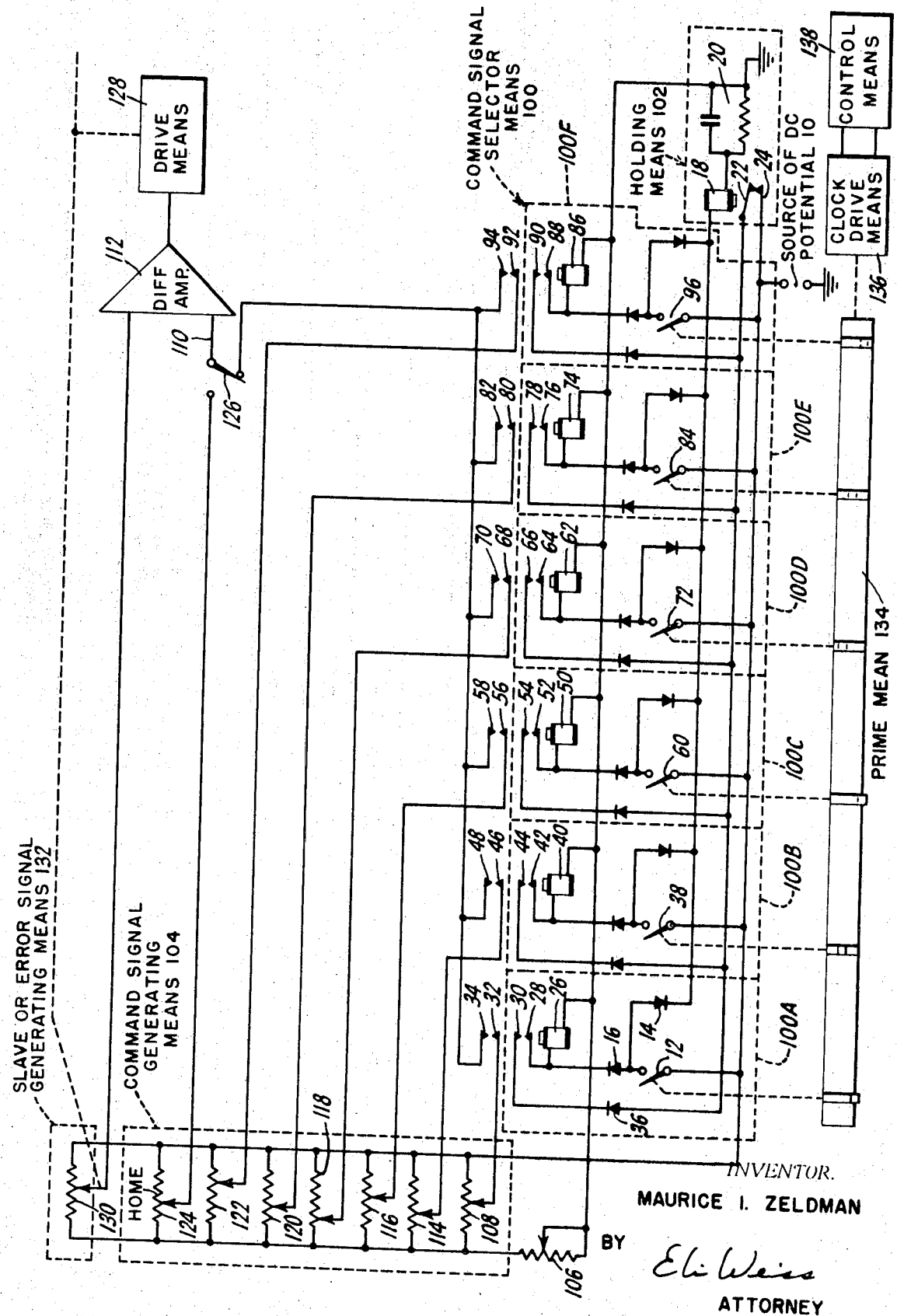

3,564,380
SELECTIVELY SEQUENTIALLY POSITIONING CONTROL
Maurice I. Zeldman, Norwalk, Conn., assignor to American Machine & Foundry Company, a corporation of New Jersey
Continuation of application Ser. No. 626,082, Mar. 27, 1967. This application Jan. 29, 1970, Ser. No. 7,364
Int. Cl. G05b *11/01*
U.S. Cl. 318—663
8 Claims

ABSTRACT OF THE DISCLOSURE

A device for programming a servo drive system, particularly a plurality of discrete signals fed selectively to a servo drive system. A number of signal generating means such as resistors are selectively coupled to feed discrete potentials to a servo drive system. Each potential represents a preselected discrete position for the servo drive system. The use of same potential insures precise repetitive positioning of the servo drive system.

---

This application is a continuation of my earlier filed copending application Ser. No. 626,082, filed Mar. 27, 1967.

This invention relates generally to a servo drive system and, in particular, to a synchronous drive which can be accurately programmed to a plurality of discrete preselected physical displacements.

In automated assembly line operations, increasing reliance is being placed upon mechanisms which can be used to eliminate hand operations. One such machine is, in essence, an articulated arm having a work holding member such as grippers or the like positioned at the fee end thereof. Frequently, the articulated arm will be programmed to move through a plurality of discrete positions during any one work cycle. An example of an articulated arm program may well be the positioning of the arm to at least six discrete stations as follows: Positioning the arm over a workpiece, lowering the arm to engage the workpiece, engaging and raising the workpiece, positioning the workpiece first over and then into a jig on a drill press for drilling, removing the workpiece from the jig and positioning it onto a conveyor belt, and then disengaging itself from the workpiece and moving into position to engage another workpiece.

Usually, the articulated arm is coupled to and driven by a servo drive system; one usually being provided for each axis or freedom of motion desired. Obviously, the successful operation of the articulate arm is dependent upon the ability of the associated servo drive system to be accurately programmed to position repeatedly the arm to preselected discrete locations.

It is an object of the present invention to provide an improved servo drive system which can be programmed to provide preselected physical displacements.

It is another object of the present invention to provide an improved servo drive system which has a versatile and readily changeable program network.

It is still another object of the present invention to provide an improved servo drive system which is reliable in operation and economical to build.

These and further objects and advantages of the present invention are achieved, in general, by a servo drive system utilizing preset signal generating means such as impedances, or the like to generate predetermined command signals fed selectively to a differential amplifier to urge a member to assume preselected physical displacements.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, wherein the figure is a schematic diagram of a circuit embodying the present invention.

Referring now to the drawing, there is disclosed structure for accurately programming a servo drive system programmed to six discrete preselected physical displacements. A source of positive potential 10 is coupled selectively through a prime means such as a switch 12 or the like to the anode terminal of a diode 14, and the anode terminal of a diode 16. The cathode terminal of diode 14 is coupled to a ground terminal through the coil of a relay 18 in series with a resistor-capacitor network 20. The relay 18 supports a pair of contacts 22, 24. The cathode terminal of diode 16 is coupled through the winding of relay 26 to a ground terminal. Relay 26 supports two sets of contacts 28, 30; 32, 34.

Contact 28 of relay 26 is coupled to the cathode terminal of diode 16; and contact 30 is coupled through a diode 36 to the contact 22 of relay 18. Contact 24 of relay 18 is coupled to the source of a positive potential 10.

The above described circuit of relay 26, its associated components and its first pair of contacts 28, 30 comprises a first station selector means 100A of a command signal selector means 100. A similar arrangement of associated components comprising a switch 38, a relay 40 and contacts 42, 44 are provided for a second station selector means 100B. In a like manner, there is illustrated a third station selector means 100C comprising the relay 50 and switch 60; a fourth station selector means 100D comprising the relay 62 and switch 72; a fifth station selector means 100E comprising the relay 74 and switch 84; and, a sixth station selector means 100F comprising the relay 86 and switch 96.

The relay 18 together with its contacts 22, 24 and the R–C network 20 comprises a holding means 102.

For each discrete physical displacement of the servo drive desired, a command signal generating means 104 composed of an impedance or the like is provided. A plurality of impedances illustrated in the drawing as being resistors in a parallel network arrangement are interposed between the source of positive potential and a ground terminal—a dropping resistor 106 of adjustable value being positioned in series with the parallel network to control the potential drop across the resistors.

A resistor 108 which can be of the adjustable type is coupled to feed a discrete signal through the contacts 32, 34 of relay 26 to an input terminal 110 of a differential amplifier 112. The signal fed by the resistor determines the discrete physical displacement of the servo drive for the first station position. Another resistor 114, coupled through contacts 46, 48 of relay 40 to terminal 110 of differential amplifier 112 feeds a discrete signal representative of the discrete physical displacement of the servo drive for the second station position.

Resistor 116, coupled in a similar manner, feeds a signal which is representative of the discrete physical displacement of the servo drive for the third station position through contacts 56, 58 to terminal 110.

Resistor 118 is coupled to feed a signal to terminal 110 through contacts 68, 70; resistor 120 is coupled to feed a signal to terminal 110 through contacts 80, 82; and resistor 122 is coupled to feed a signal to terminal 110 through contacts 92, 94 to represent the discrete physical displacement of the servo drive for the fourth, fifth and sixth station positions respectively.

If desired, a home or reference position for the servo drive can be established by providing a resistor 124 to feed a discrete signal to terminal 110 of the differential amplifier. A switch 126 is provided to permit the home or reference signal to be fed selectively into the differential amplifier.

A drive means 128, which can be a hydraulic valve and a fluid cylinder or fluid motor; or an electrically driven means is fed by said differential amplifier to position selectively a member such as a shaft or the like either axially or longitudinally—to a discrete position.

An impedance 130 here shown as a resistor comprises the slave or error signal generating means 132. Resistor 130 is driven to coincidence with that resistor then currently feeding terminal 110 of differential amplifier 112.

Each of the contacts of the figure (other than those of switch 126 and contacts 22, 24 of relay 18) are normally open. In operation, the switches 12, 38, 60, 72, 84 and 96 are intermittently closed in a preselected sequence either manually or automatically. If the operation is to be fully automatic, then a plurality of cam type of devices or multiposition switches 134 driven by a clock drive means 136 can be provided. Control means 138 coupled to the clock drive means 136 determines the cycle repetition rate of the device by controlling the rate of rotation of the cam type of device 134. Control means 138 can also stop selectively the rotation of the cam type of device to permit synchronous or piecewise synchronous operation of the occurrence of other procedures, if desired.

Initially, it shall be presumed that switch 12 is closed. A signal is fed through diode 16 to the winding of relay 26 closing contacts 28, 30; and 32, 34. A signal is also fed through the winding of relay 18 opening the contacts 22, 24.

Closed contacts 32, 34 feed a discrete first station signal to the input terminal 110 of differential amplifier 112, and drive means 128 is driven in that direction which will establish coincidence between the signals from resistor 108 and resistor 130. Immediately upon the closing of switch 12, the relay 18 is energized and contacts 22, 24 open. Shortly thereafter, through the effect of the R-C network, the current through the relay is reduced below its hold valve and relay 18 assumes its deenergized state. Contacts 22, 24 close. The signal fed through closed contacts 22, 24 flows through diode 36, closed contacts 28, 30 and the winding of relay 26 to a ground terminal. Switch 12 can now be opened without effecting the energization of relay 26; and, the drive means is driven by the differential amplifier until a null condition occurs. At some interval of time subsequent to the occurrence of a null condition, another of the switches such as 38 is closed, and relays 40 and 18 are energized. Energization of relay 18 momentarily opens contacts 22, 24; and relay 26 is deenergized. Shortly thereafter, contacts 22, 24 close, a signal is fed through closed contacts 42, 44 to maintain or hold relay 40 in its energized state, and switch 38 is then opened without effecting the energization of the relay 40.

In a like manner, each of the other switches 60, 72, 84 and 96 are closed to feed a discrete signal to the differential amplifier and to urge the drive means to assume a discrete preselected physical displacement. The switches can be operated manually or by a cam type of device driven at a constant controlled speed. When the cam type of device is driven at a constant controlled speed, sufficient time must be allotted between the operation of each of the switches to permit the drive means to reach its null position, or a slewing action could occur between points.

Under certain circumstances, it may be desirable to hold the drive means at one station until a certain external condition or function is completed. This can be accomplished by presetting the control means 138 to stop the advance of the cam type of device until it receives an advance signal from an external source such as an automatically or manually controlled switch.

Under certain circumstances, it is desirable to position the drive means to a home or reference position. This is accomplished by positioning switch 126 to connect impedance 124 with the input terminal 110 of differential amplifier 112. To provide a manual control means, impedance 124 can be connected to an easily movable element such as a lever or the like. Thus, rotation of the lever to vary the signal fed to the differential amplifier will urge the drive means in a specific direction and at a particular speed.

The command signal generating means 104 is illustrated as being coupled to drive a single drive means 128. This arrangement provides motion along a single or X axis. If desired, motion can be obtained along the Y and Z axis. Where motion along the Y axis is desired, all of the structure shown with the exception of the command signal generating means 104 and possibly the control means 138, clock drive means 136 and cam type of device 134 should be duplicated. The signals for the command signal generating means 104 used for the X axis are also used for the Y axis. In a similar manner, the signals for the command signal generating means 104 can also be used for positioning along the Z axis. Thus, depending upon the program required, a single resistor such as 120 of the command signal generating means 104 can be used to drive the X, Y and Z axis drive means separately or in any desired combination at various times during any one program.

Obviously, many modifications and variations of the present invention are possible in the light of the above teachings. It is, therefore, to be understood that within the scope of the appended claims the invention may be practiced otherwise than as specifically described.

I claim:

1. A servo drive system for actuating a movable member and means for successively supplying predetermined command signals to the servo system comprising,
   means providing a plurality of command signals, each command signal having a predetermined value to produce a desired movement of the movable member when coupled to the drive system,
   switch means operable to couple said command signals one at a time in a predetermined sequence to said drive means,
   a plurality of switch selector means each operable when actuated to cause said switch means to couple a respective command signal to said drive means,
   means for selectively actuating said switch selector means in a predetermined sequence,
   a plurality of hold circuits each operable to maintain a respective actuated switch selector means in its actuated condition irrespective of said means for selectively actuating the switch means,
   hold circuit control means parallel connected to all of said switch selector means and operable in response to the actuation of any one of said switch selector means to interrupt all of said hold circuits, whereby the interrupted held circuits are ineffective to maintain their respective switch selector means in an actuated condition, and
   means responsive to the actuation of each one of said switch selector means for rendering said hold circuit control means operative to interrupt said hold circuits only for a brief instant of time that is short compared to the time that a switch selector means is actuated.

2. The combination claimed in claim 1 wherein
said means for rendering said hold circuit means operative is circuit means connected in series circuit with the hold circuit control means.

3. The combination claimed in claim 1 wherein
said hold circuit control means comprises a relay that controls a normally closed switch that is common to all of the hold circuits.

4. The combination claimed in claim 3 wherein
said means for rendering said hold circuit means operative is a combination of passive circuit elements coupled to said relay.

5. The combination claimed in claim 4 wherein
said circuit elements function to energize said relay to open and normally closed switch only when a switch selector means is first actuated.

6. A drive system for actuating a movable member and means for successively supplying predetermined command signals to the system comprising
means for providing a plurality of command signals, each command signal having a predetermined value to produce a desired movement of the movable member when coupled to the drive system,
a plurality of normally open switch means each operable when closed to couple a respective command signal to said drive system,
a plurality of relays each associated with a respective one of said switch means and operable when energized to close its associated switch means,
relay selector means for selectively energizing said relays in a preselected sequence and each for a selected interval of time,
a plurality of hold circuits each connected from a source of potential through a respective relay back to said source,
a normally open switch in each of said hold circuits and operable to close upon energization of the relay in the respective hold circuit,
a hold circuit having its switch closed operating to independently energize its respective relay,
a common relay parallel connected to all of said relay selector means and being energized when any one of said plurality of relays is energized by its associated selector means,
a normally closed switch common to all of said hold circuits and controlled by said common relay,
a passive time constant circuit connected with said common relay and operable each time a relay selector means energizes a respective one of the plurality of relays for energizing the common relay to a high energization level for a brief instance of time that is shorter in duration than said selected interval of time,
the common relay operating to open said normally closed switch that is common to all hold circuits only when energized to said high energization level, whereby all of said hold circuits are opened during said brief instant each time the common relay is energized to its high level,
whereby the only one of the plurality of relays that is energized during each brief instant of time is the one energized by its respective relay selector means.

7. The combination claimed in claim 6 wherein
said drive system is comprised of a servo system having feedback means for generating an error signal,
said servo system including a differential amplifier having two input terminals for receiving, respectively, said error signal and selected command signals from said switch means.

8. A servo drive system comprising a differential amplifier, a drive means fed by said differential amplifier and coupled to position a member, a first variable impedance driven by said member to generate error signals and coupled to feed said error signals to said differential amplifier, a second variable impedance and a third variable impedance each set to generate and feed to said differential amplifier a discrete command signal, a first relay interposed between said second variable impedance and said differential amplifier to pass selectively signals from said second impedance, a second relay interposed between said third variable impedance and said differential amplifier to pass selectively signals from said third impedance, a first switch coupled to activate said first relay to pass signals from said second impedance to said differential amplifier, a second switch coupled to activate said second relay to pass signals from said third impedance to said differential amplifier, a third relay energized by said first or second switches coupled to feed a relay holding current to said first or second relays, a resistor-capacitor network coupled to said third relay to be selectively energized by said first or second switch, said third relay being coupled to first interrupt the flow of holding current to said first and second relays and then feed a holding current to said first and second relays to maintain activated that relay activated by a switch, and cams coupled to activate selectively said first and second switches.

References Cited

UNITED STATES PATENTS

| Re. 26,404 | 6/1968 | Lunn et al. | 318—18X |
| 1,434,158 | 10/1952 | Scott | 318—29 |
| 3,296,521 | 1/1967 | Wildberger | 318—29X |
| 3,297,925 | 1/1967 | Masel | 318—28 |

FOREIGN PATENTS

| 1,231 | 1959 | Japan. |

BENJAMIN DOBECK, Primary Examiner

U.S. Cl. X.R.

318—678